(12) United States Patent
Chen et al.

(10) Patent No.: US 11,842,223 B2
(45) Date of Patent: Dec. 12, 2023

(54) EDGE ARTIFICIAL INTELLIGENCE (AI) COMPUTING IN A TELECOMMUNICATIONS NETWORK

(71) Applicant: VMware, Inc., Palo Alto, CA (US)

(72) Inventors: Tiejun Chen, Beijing (CN); Chris Wolf, Draper, UT (US); Mazhar Memon, Troy, MI (US); Peter Buckingham, San Francisco, CA (US); Shreekanta Das, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 3 days.

(21) Appl. No.: 17/651,504

(22) Filed: Feb. 17, 2022

(65) Prior Publication Data

US 2023/0229521 A1   Jul. 20, 2023

(30) Foreign Application Priority Data

Jan. 19, 2022  (WO) ................ PCT/CN2022/072761

(51) Int. Cl.
*G06F 9/50* (2006.01)
*H04L 67/289* (2022.01)

(52) U.S. Cl.
CPC .......... *G06F 9/5077* (2013.01); *G06F 9/5055* (2013.01); *H04L 67/289* (2013.01); *G06F 2209/5011* (2013.01)

(58) Field of Classification Search
CPC ....... H04L 65/75; H04L 65/80; G06F 9/5077; G06F 9/5055; G06F 2209/5011
See application file for complete search history.

(56) References Cited

U.S. PATENT DOCUMENTS

| | | | |
|---|---|---|---|
| 2022/0012005 A1* | 1/2022 | Soong | H04L 65/764 |
| 2022/0191583 A1* | 6/2022 | Baran | H04L 65/80 |
| 2022/0197773 A1* | 6/2022 | Butler | H04N 21/2187 |
| 2022/0394072 A1* | 12/2022 | Aristarkhov | H04N 19/172 |

\* cited by examiner

*Primary Examiner* — Kristie D Shingles
(74) *Attorney, Agent, or Firm* — Patterson + Sheridan, LLP

(57) ABSTRACT

Disclosed herein is the integration into edge nodes of a telecommunications network system of client computer system and server computer system where the server computer system includes a pool of shareable accelerators and the client computer runs an application program that is assisted by the pool of accelerators. The edge nodes connect to user equipment, and some of the user equipment can themselves act as one of the client computer systems. In some embodiments, the accelerators are GPUs, and in other embodiments, the accelerators are artificial intelligence accelerators.

20 Claims, 9 Drawing Sheets

EDGE ARTIFICIAL INTELLIGENCE (AI) COMPUTING IN A TELECOMMUNICATIONS NETWORK

CROSS-REFERENCE TO RELATED APPLICATION(S)

This application claims benefit of and priority to International Application No. PCT/CN2022/072761, filed Jan. 19, 2022, which is hereby assigned to the assignee hereof and hereby expressly incorporated by reference herein in its entirety as if fully set forth below and for all applicable purposes.

BACKGROUND

Early telecommunications (telecom) networks, such as 3G and 4G, employed a core network that connected wireless user equipment to the Internet. Such an arrangement has a drawback in that user equipment (UE) communications must traverse the core network to get to services (such as cloud services) available on the Internet. A telecommunications network deployment, such as a 5G network, modifies this arrangement by offloading compute and storage services from the telecom core network into an edge network. This offloading, called edge computing, reduces the load on the core network of the telecommunications system and enables content and applications to be processed as close as possible to the edge of the core network and closer to the user equipment, such as smartphones. When edge computing offers application developers and services providers cloud computing capabilities at the edge of the network, edge computing becomes cloud-edge computing. When cloud-edge computing provides one or more types of access technology in close proximity to the telecom users, the computing is termed multi-access edge computing (MEC). MEC is provided in telecommunication networks, such as 5G.

Hosts or servers typically used in edge computing have low compute power. Sometimes the edge-computing hosts include hardware accelerators, but the accelerators cannot be shared by the user equipment of the telecom network or lock the user equipment into proprietary hardware or proprietary software for the specific hardware.

What is needed is high-speed, low latency access by user equipment to accelerators in the hosts of the edge-computing network.

SUMMARY

A Bitfusion server is deployed in edge servers of the telecom network. A Bitfusion client is installed on hosts or servers in edge nodes without one or more types of discrete hardware (HW) accelerators like graphics processing units (GPUs) or artificial intelligence (AI) accelerators, where an accelerator is a processor targeted to have performance for a particular type of workload. The Bitfusion server can perform machine learning applications locally when accelerators are included on the edge nodes. High performance is possible with low latency and high bandwidth produced by the telecom network. More importantly, customers can run their AI applications without having to direct their application to a particular server to obtain acceleration for the application. Though certain aspects are discussed with respect to a Bitfusion server and client, the techniques may be applicable to other types of computing devices, such as other computing devices or servers and clients that can virtualize HW accelerators.

An AI HW service is provided that is open for any machine learning framework and is (1) powerful because a hardware accelerator on a host in the cloud edge can be shared by other hosts in the cloud edge, and (2) flexible and elastic because user equipment can have access to different level AI computing power according to different use cases at different time, and (3) cost-saving because customers do not need to replace or upgrade edge systems.

One embodiment provides a method of accessing a pool of accelerators. The method includes establishing the pool of accelerators on hardware of a server computer system, where the server computer system has loaded thereon a library, loading an application program on a client computer system, where the client computer system has loaded thereon the library and the application that uses the library, the client computer system, and the server computer system are running in edge nodes in a telecommunications system. The edge nodes are connected to one or more items of a plurality of user equipment that uses the application program. The method further includes intercepting a library call by the application program, sending the call to the server computer system for execution assisted by the pool of accelerators, receiving results of the call from the server computer system, and sending the results to the application program on the client computer system, where use of the application program by one or more items of the user equipment is accelerated by the pool of accelerators.

Further embodiments include a computer-readable medium configured to carry out one or more aspects of the above method and a computer system configured to carry out one or more aspects of the above method.

DETAILED DESCRIPTION

Telecommunications (telecom) systems that support multi-access edge computing include hosts or servers with minimal computing power. If the hosts or servers have hardware accelerators (to improve their compute power), the hardware and software designed for these accelerators is proprietary, locking the telecom system's users into the proprietary hardware and/or software. To make a variety of hardware accelerators available to users without locking the users into proprietary hardware and software, an MEC host computer system (server) with hardware accelerators installed and an MEC host computer system with client software that accesses the MEC server are provided in the edge cloud of the telecom system. The client software includes a user application and a library suited to the application, and the MEC server receives service requests from the client software, services the requests using the hardware accelerators, and returns the results to the client software. The MEC hosts with client software and hardware accelerators enable telecom users to have high-speed, low latency transparent access to hardware-accelerated computing without traversing the telecom provider's core cloud.

Figure 1:
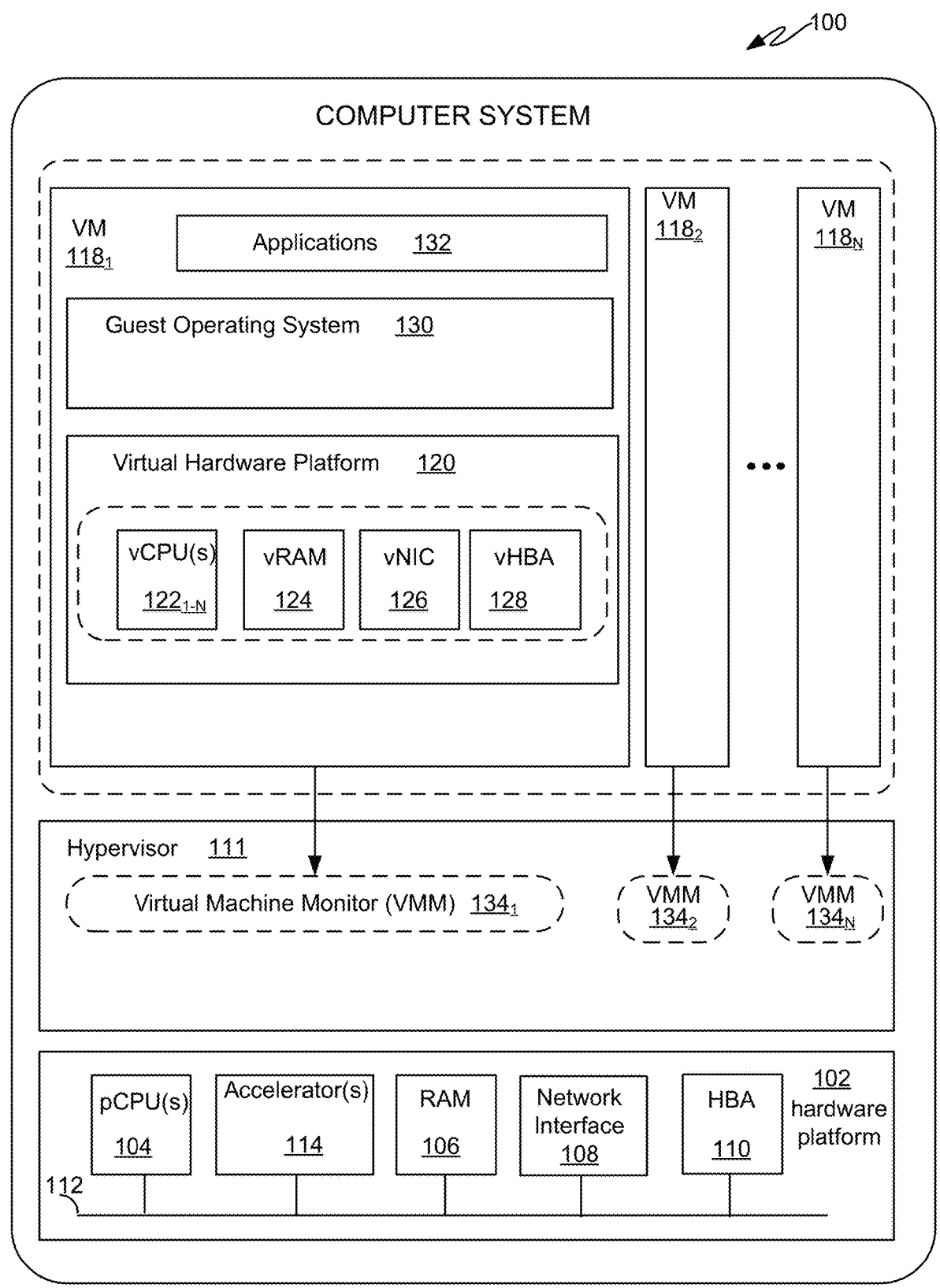
FIG. 1 depicts a block diagram of a computer system that is representative of a virtualized computer system architecture in which embodiments may be implemented.

FIG. 1 depicts a block diagram of a computer system 100 that is representative of a virtualized computer architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more items of processing hardware such as physical central processing units (pCPUs) 104, accelerators 114, a random access memory (RAM) 106, one or more network interfaces 108 for connecting to a network, and one or more host bus adapters (HBA) 110 for connecting to a storage system, all interconnected by a bus 112.

A virtualization software layer, referred to hereinafter as hypervisor 111 or kernel 111, is installed on top of hardware platform 102. Hypervisor 111 makes possible the instantiation and concurrent execution of one or more virtual machines (VMs) $118_1$-$118_N$. The interaction of VM 118 with hypervisor 111 is facilitated by the virtual machine monitors (VMMs, also referred to as monitors) 134. Each VMM $134_1$-$134_N$ is assigned to and monitors a corresponding VM $118_1$-$118_N$. In one embodiment, hypervisor 111 may be implemented as a commercial product in VMware's vSphere® virtualization product, available from VMware Inc. of Palo Alto, CA.

In an alternative embodiment, hypervisor 111 runs on top of a host operating system which itself runs on hardware platform 102. In such an embodiment, hypervisor 111 operates above an abstraction level provided by the host operating system. After instantiation, each VM $118_1$-$118_N$ encapsulates a virtual hardware platform that is executed under the control of hypervisor 111, in particular the corresponding VMM $134_1$-$134_N$. For example, virtual hardware devices of VM $118_1$ in virtual hardware platform 120 include one or more virtual CPUs (vCPUs) $122_1$-$122_N$, a virtual random access memory (vRAM) 124, a virtual network interface adapter (vNIC) 126, and virtual host bus adapter (vHBA) 128. Virtual hardware platform 120 supports the installation of a guest operating system (guest OS) 130, on top of which applications 132 are executed in VM $118_1$. Examples of guest OS 130 include any of the well-known commodity operating systems, such as the Microsoft Windows® operating system, the Linux® operating system, and the like.

It should be recognized that the various terms, layers, and categorizations used to describe the components in FIG. 1 may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since each VMM includes the hardware emulation components for the virtual machine.

Figure 2:
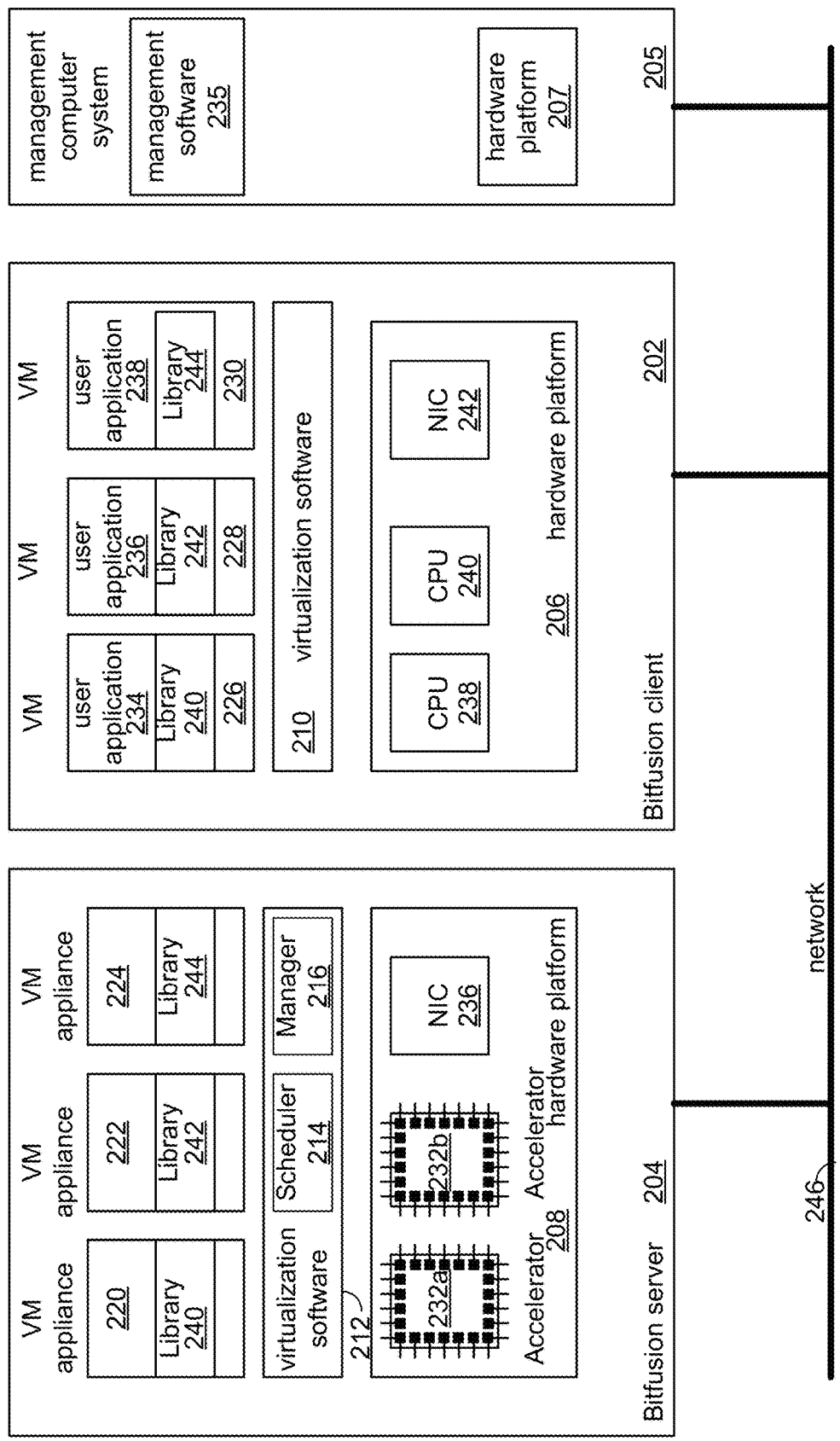
FIG. 2 depicts an architecture of Bitfusion, according to an embodiment.

FIG. 2 depicts an architecture of Bitfusion, according to an embodiment. In the figure, the architecture includes one or more Bitfusion servers 204 and one or more Bitfusion clients 202, connected by a network 246 and managed by a management computer system 205 such as the computer system 100 of FIG. 1 with a hardware platform 207 and management software 235.

The Bitfusion client 202 is a virtual machine 226, 228, 230 or container which runs on a server, such as the computer system depicted in FIG. 1. The virtual machine or container has loaded therein an AI or ML application 234, 236, 238 written to use a framework such as those of TensorFlow and PyTorch along with a library 240, 242, 244 for a particular type of accelerator.

The Bitfusion servers 204 run on servers such as the computer system depicted in FIG. 1 and include libraries 240, 242, 244, and accelerators 232$a$, 232$b$ in the hardware platform. For example, when the accelerators 232$a$ and 232$b$ are GPUs, libraries 240, 242, and 244 are CUDA libraries. The accelerators 232$a$, 232$b$ of the Bitfusion servers 204 are viewed by the Bitfusion client 202 as a pool of network-accessible resources shareable among Bitfusion clients.

The management computer system 205 can monitor the health, utilization, efficiency, and availability of the Bitfusion servers 204 and can assign quotas and time limits to the resources.

Figure 3A:
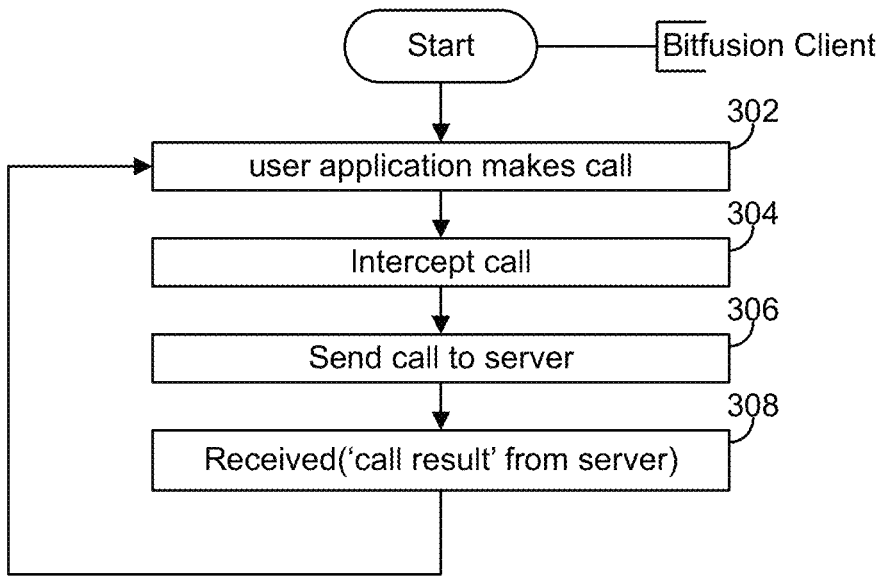
FIG. 3A depicts a flow of operations of the BitFusion client, according to an embodiment.
Figure 3B:
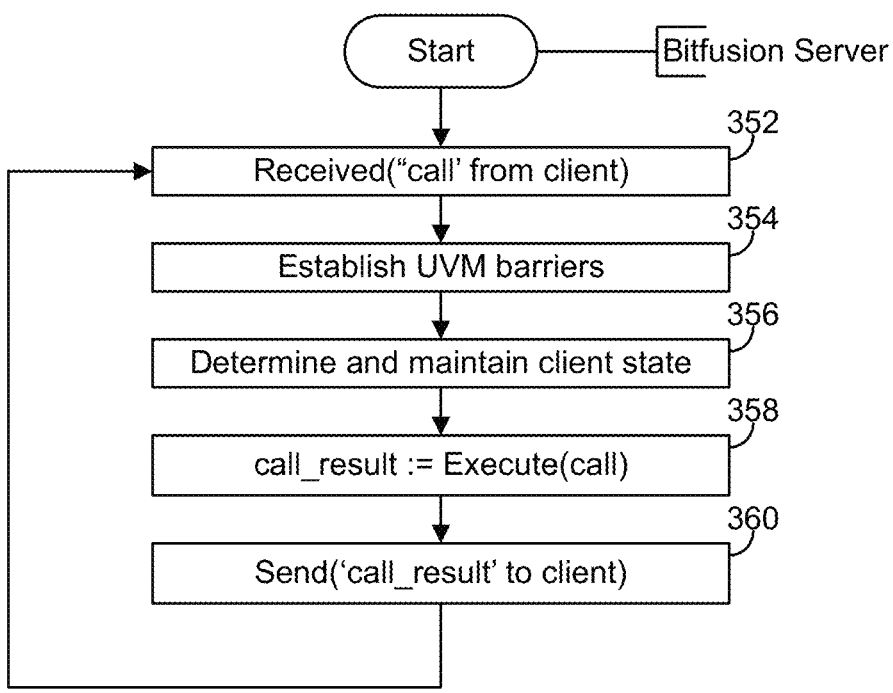
FIG. 3B depicts a flow of operations of the BitFusion server, in an embodiment.

FIGS. 3A and 3B depict a flow of operations of the Bitfusion client and Bitfusion server cooperating to service a library or application call from the Bitfusion client on the Bitfusion server. For the Bitfusion client 202 and Bitfusion server 204 to cooperate, a memory space of the Bitfusion client and a memory space accessible by the accelerators on the Bitfusion server is declared to be shared virtually. This means that each memory space, being part of the virtually shared memory space, is maintained to be consistent with the other according to a Modified, Exclusive, Shared, and Invalid (MESI) protocol. To enforce the MESI protocol on the virtually-shared memory, synchronization points (memory barriers) are established in the code on the Bitfusion client 202 and Bitfusion server 204. One barrier is a code point requiring that any memory access to the shared space reflect any changes occurring prior to the barrier. Another barrier is a code point requiring that any changes made prior to the barrier be visible after the barrier.

FIG. 3A depicts a flow of operations of the Bitfusion client, according to an embodiment. In step 302, the user application running on the Bitfusion client 202 makes a library or other application call, and in step 304, the Bitfusion client 202 intercepts the call (i.e., prevents the call from being executed locally) and sends the call (with its parameters), via network 246, to the Bitfusion server 204 in step 306. In step 308, the Bitfusion client 202 waits for and receives the results of a library call from the Bitfusion server 204.

FIG. 3B depicts a flow of operations of the BitFusion Server, in an embodiment. In step 352, the Bitfusion server 204 receives the library or application call from the Bitfusion client 202, establishes memory synchronization points between the client and the server to facilitate sharing memory space between the client and the accelerators in the server in step 354, determines the client memory state (whether the memory is coherent with the server memory) in step 356, and in step 358 executes the library or application call using the local pool of hardware accelerators. In step 360, the Bitfusion Server 204 returns the result of the call to the Bitfusion client 202. In this manner, the Bitfusion client has access to the pool of accelerators on the Bitfusion server, which executes the library call with the help of the accelerators locally. For example, if a pool of accelerators on the Bitfusion server is a pool of GPUs, the library call is a CUDA library call. A user at the Bitfusion client 202 obtains the benefit of the accelerator on the Bitfusion server 204 without having to install accelerators on the Bitfusion client 202.

Figure 4A:
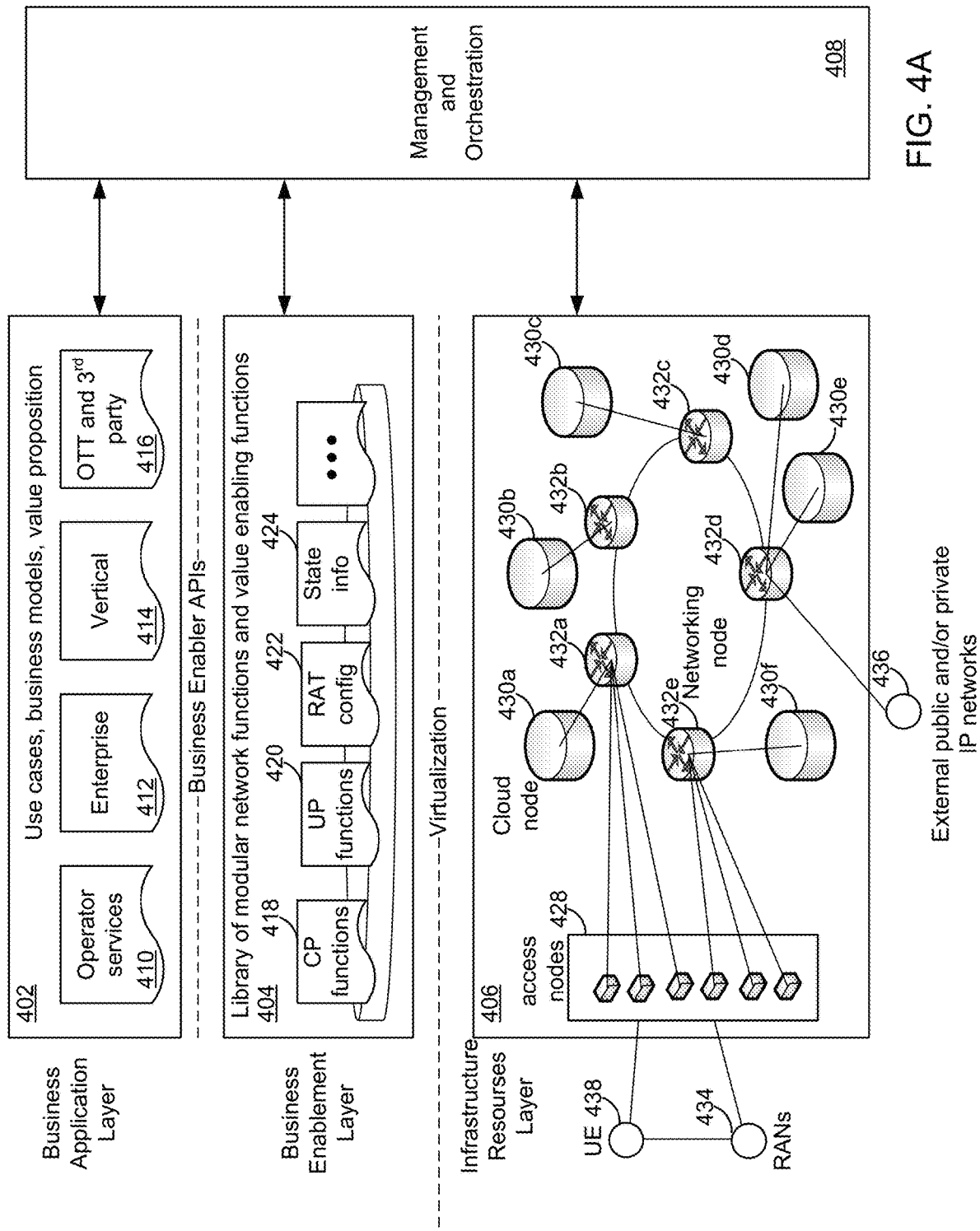
FIG. 4A depicts a representative block diagram of a telecommunications network system.

FIG. 4A depicts a representative block diagram of a state-of-the-art telecommunications network system. The telecommunications network system includes an infrastructure resources layer 406, a business enablement layer 404, and a business application layer 402. The infrastructure resources layer 406 provides the physical resources and system software for a fixed and mobile network. The layer includes cloud nodes 430a-f, which provide cloud services, software, and storage resources. The cloud nodes may be part of a core cloud or an edge cloud. The nodes of the edge cloud provide low latency and higher-security access to user equipment (UE) at the edge of the network. The layer further includes networking nodes 432a-e, which are IP routers and other types of switches for implementing a physical path through the network. One or more IP routers 432a-e connect to an external public and/or private IP network 436.

Access nodes 428 in the infrastructure resources layer 406 provide an interface to one or more radio access networks (RANs) 434, which provides access to UE 438, both mobile and fixed.

Hardware and software resources in the infrastructure resources layer are exposed to higher layers 402, 404 (described below) and to an end-to-end management and orchestration entity 408 through the relevant application programming interfaces (APIs), including business enabler APIs. Performance and status monitoring functions and configuration control are included in the APIs.

One of the higher layers is the business enablement layer 404, which is a library of all functions required in the network in the form of modular building blocks. Functions include control plane (CP) functions 418, which are modules that implement control signaling functions within the network, and user plane (UP) functions 420, which are modules that deal with the exchange of user data over a connection. Further included is a radio access technology (RAT) configuration function 422, which helps configure the elements in the radio access network (RAN) 434. State information 424 includes the state of network connections and RAN radio channels.

The other higher layer is the business application layer 402, which contains applications and services that support users of the network. Users include the mobile network operator 410, a business enterprise 412 that provides applications that run on mobile devices, and cloud-based services that enable application portability across multiple devices. Users also include vertical business organizations 414, which provide services to specific industries or professions. Finally, users are those that provide over-the-top and third-party services 416 such as voice-over-IP (VOID), short message service (SMS), general applications, cloud services like Dropbox, and Internet television.

The Management and Orchestration (MO) entity 408 is the contact point to translate the use cases and business models into actual network functions and slices, where a network slice is a collection of network functions and specific RAT settings combined together for the use case or business model. The MO entity 408 defines network slices for a given application scenario, chains the relevant modular network functions, assigns the relevant performance configurations, and maps all of this onto the infrastructure resources layer 406 via a virtualization interface that supports network functions virtualization (NFV) and software-defined networking (SDN). Types of network slices are smartphone slice, automotive device slice, and a slice for IoT devices.

As mentioned above, cloud nodes 430a-f may be core nodes or edge nodes. Core nodes have separate control plane functions and user plane functions. Control plane functions include network slicing, user device mobility management, quality of service (QoS) control, direct and indirect wireless connections, and broadcast and multicast service. User plane functions include traffic routing and forwarding and QoS enforcement. Edge nodes may be a MEC system, which is described in reference to FIG. 4B.

Figure 4B:
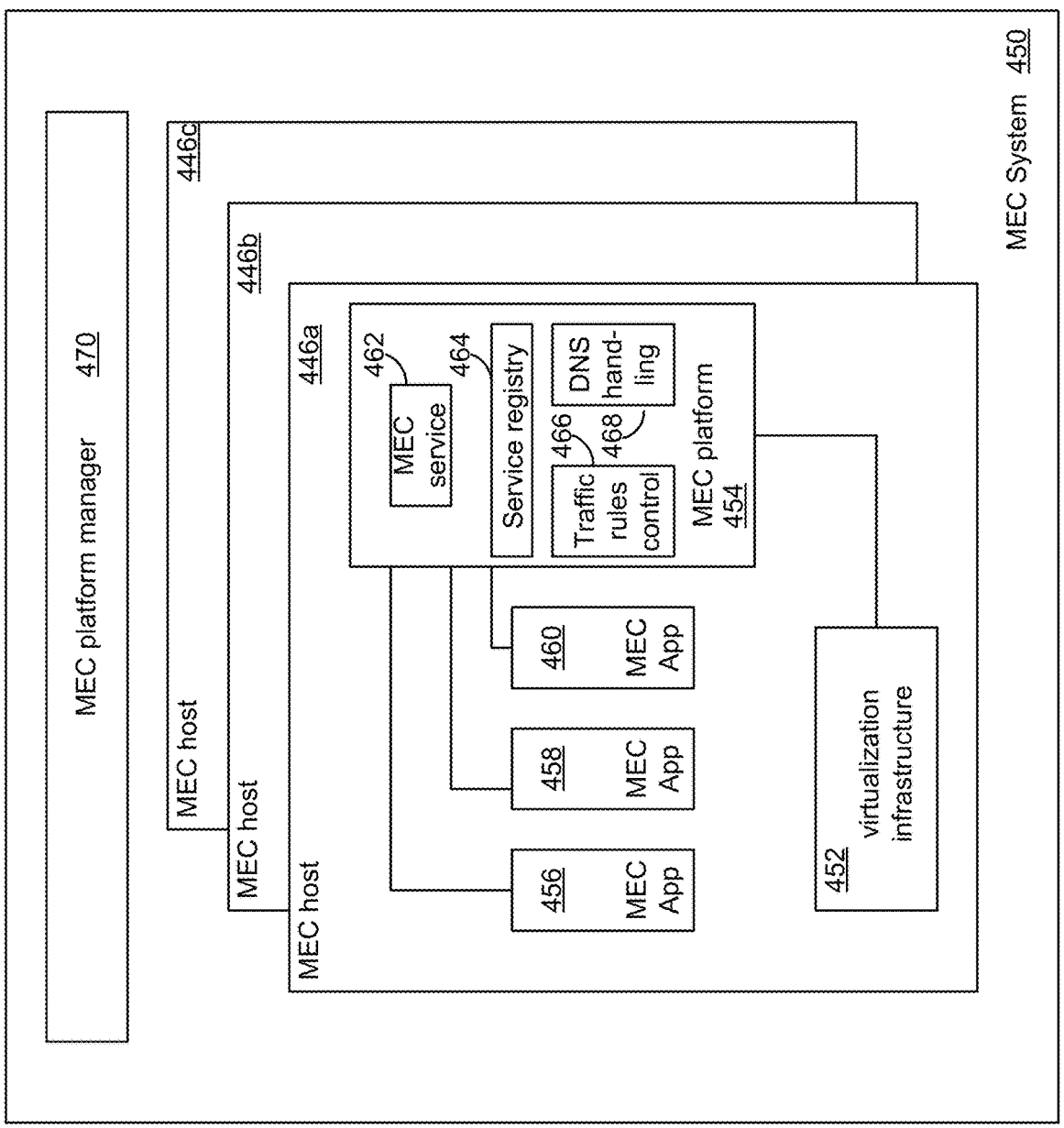
FIG. 4B depicts a MEC system with MEC hosts.

FIG. 4B depicts a MEC system with MEC hosts. The MEC system 450 is a collection of MEC hosts 446a-c and a MEC platform manager 470. Each MEC host 446a-c includes MEC Applications 456, 458, 460, an MEC platform 454, and a virtualization infrastructure 452 that provides compute, storage, and network resources to MEC applications 456, 458, 460.

The MEC applications 456, 458, 460 are virtual network functions that run on virtual machines. These include user applications (such as applications 234, 236, 238 in FIG. 2) and network applications. The MEC applications 456, 458, 460 interact with the MEC platform 454 to obtain services to indicate availability and to perform application relocation when required. MEC applications 456, 458, 460 can provide services to other peer applications.

The MEC platform 454 is a collection of functionality used to run MEC applications 456, 458, 460 on the virtualization infrastructure 452. The MEC platform 454 includes an MEC service 462, a service registry 464, traffic rules control 466, and DNS handling 468. The MEC service 462 exposes network-related APIs to the MEC applications. MEC services provide information related to the user equipment (UE) served by the radio nodes associated with the MEC host and the location of the UE service by the radio nodes and allocate bandwidth to the UE traffic.

The virtualization infrastructure 452 includes a data plane that executes the traffic rules 466 received by the MEC platform 454 and routes the traffic among the MEC applications 456, 458, 460, services 462, the DNS server/proxy 468, the telecommunications network, and other access networks.

MEC applications 456, 458, 460 in an MEC host 446a can support Bitfusion Client applications, and each MEC host 446a, 445b, 446c can also be a Bitfusion Server with accelerators.

Figure 5:
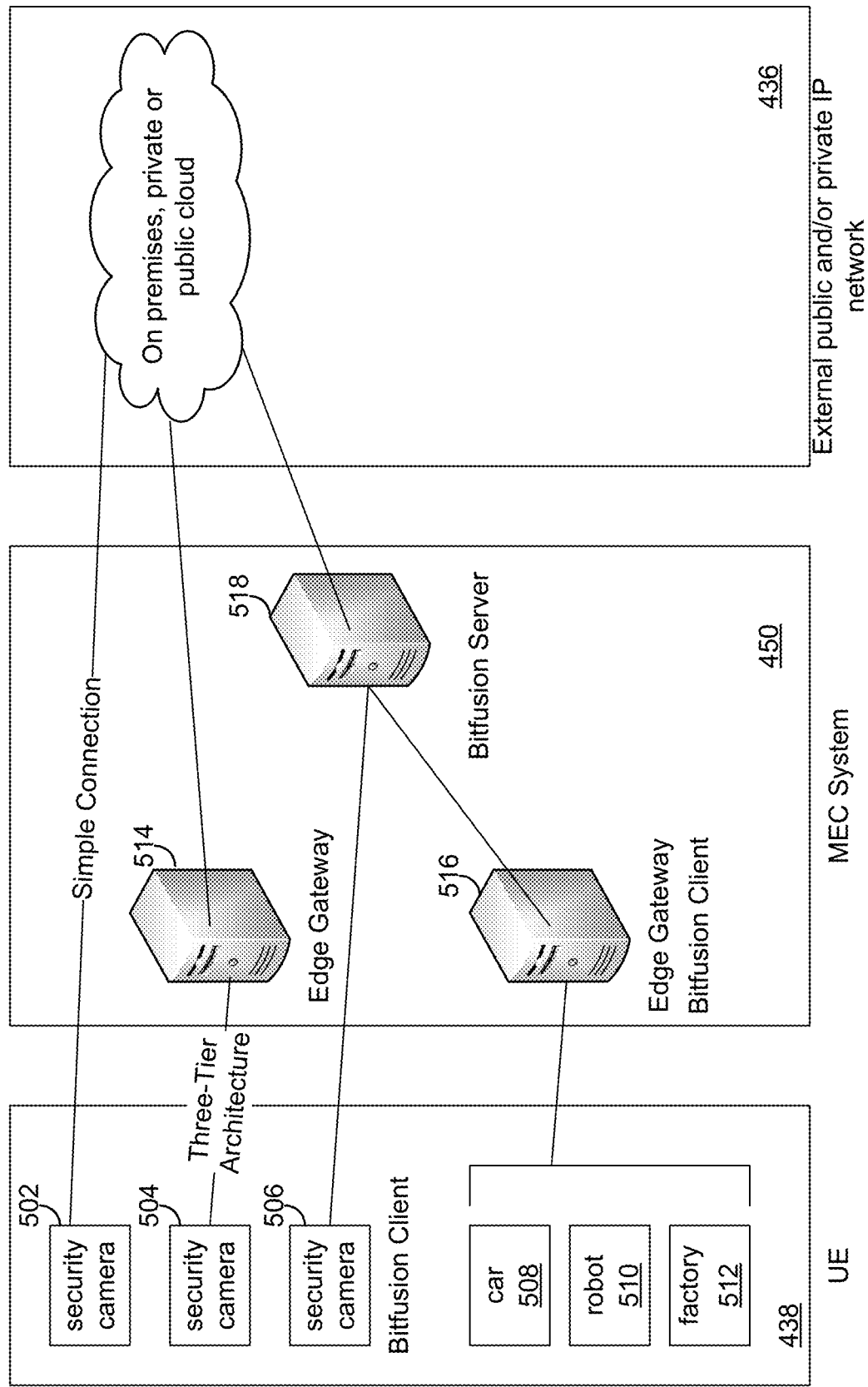
FIG. 5 depicts an integration of Bitfusion in the edge cloud, according to a first embodiment.

FIG. 5 depicts an integration of Bitfusion into the MEC system, according to a first embodiment. This embodiment includes an array of UE, including smartphones, automotive devices such as self-driving cars 508, UE 438, servers 514, 516, 518 in the MEC system 450, and a Cloud 436. Certain aspects are discussed with respect to devices being Internet of Things (IoT) devices, but it should be understood that they may be any suitable devices. The UE 438 may include such items as security cameras 502, 504, 506, robots 510, and a smart factory 512.

The MEC system 450 includes three servers 514, 516, 518. The first server 514, an edge gateway, provides MEC application support for IoT devices 504 in the radio access network, such as non-mobile security cameras.

The second server 516 is an edge gateway and a Bitfusion client that connects to a number of IoT devices 508, 510, 512 in the radio-access network, such as a self-driving car, a robot, and a smart factory.

The third server 518 is a Bitfusion server (204 in FIG. 2) having a pool of accelerators, such as GPUs, installed in its hardware platform. The second server 516 sends library calls to the third server 518 to make use of the pool of accelerators, as described in FIGS. 3A and 3B. The third server 518 receives transmissions from a non-mobile IoT device such as a security camera 506, acting as a Bitfusion client, and from the second server 516, acting as a Bitfusion client.

Cloud 436 is an on-premises public or private cloud network. Cloud 436 receives transmissions from a non-mobile source as a security camera 502 over a simple connection, transmission from the second server 516 (an edge gateway), and transmissions from the third server 518 (the Bitfusion server).

Figure 6:
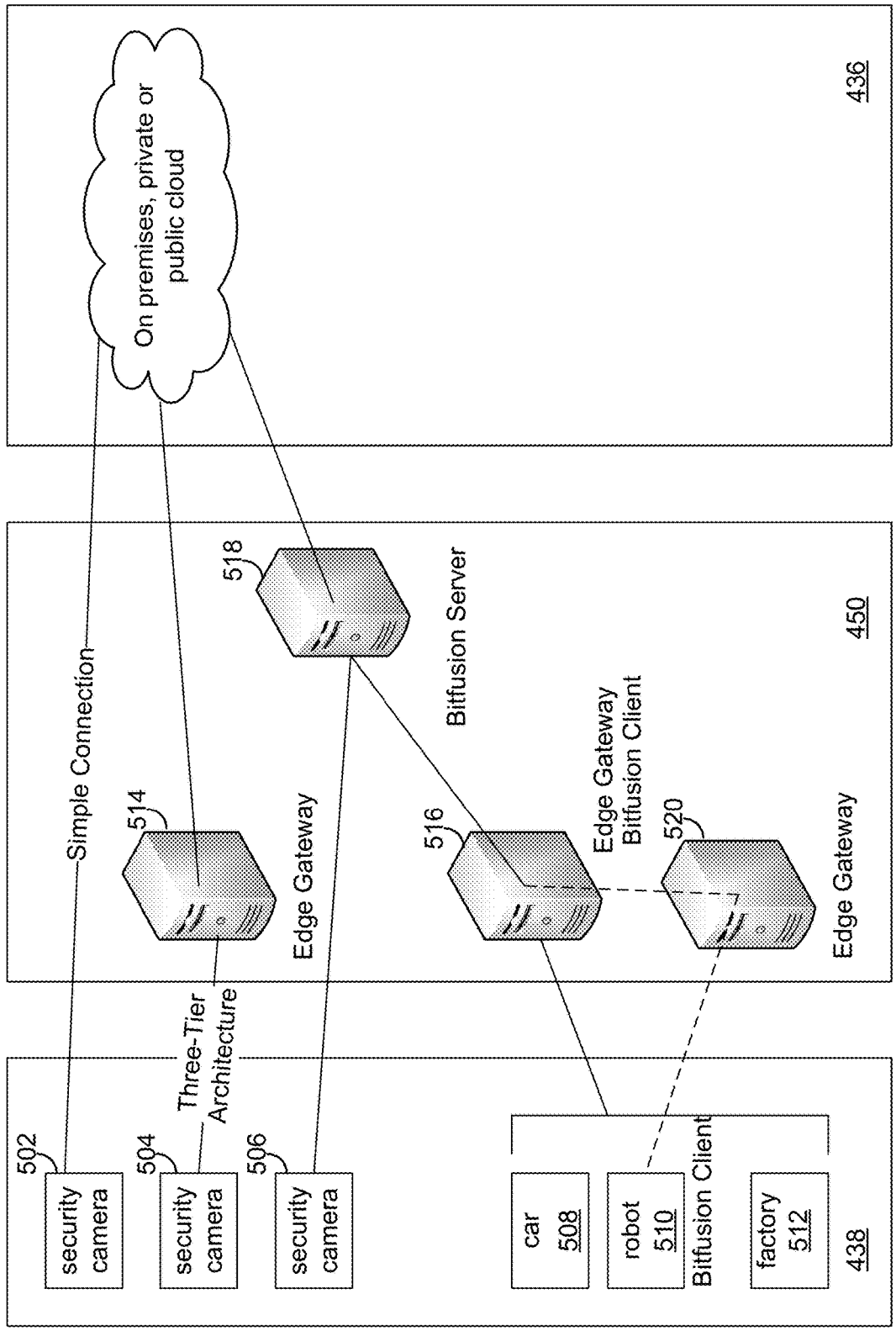
FIG. 6 depicts an integration of Bitfusion in the edge cloud, according to a second embodiment.

FIG. 6 depicts an integration of Bitfusion in the edge cloud, according to a second embodiment. This embodiment includes user equipment 438, MEC system 450, and cloud 436.

In this embodiment, the MEC system 450 includes four servers 514, 516, 518, 520. The first server 514, an edge gateway in the edge cloud, connects to a non-mobile source such as a security camera 504.

The second server 516 is an edge gateway acting as a Bitfusion client and connects to a mobile IoT device such as a self-driving car 508, a robot 510, or a smart factory 512.

The third server 518 is a Bitfusion server that connects to a non-mobile IoT device, such as a security camera 506, and to the second server 516 (Bitfusion client).

The fourth server 520 is a power edge gateway with installed accelerators and can be configured to act as a Bitfusion Server. The fourth server 520 may be connected either to Bitfusion client 516 or Bitfusion Client 510.

Cloud 436 is an on-premises public or private cloud network. Cloud 436 receives transmissions from UEs such as a security camera 502 over a simple connection, transmission from the second server 516 (the edge gateway), and transmissions from the fourth server 520 (the Bitfusion server).

Figure 7A:
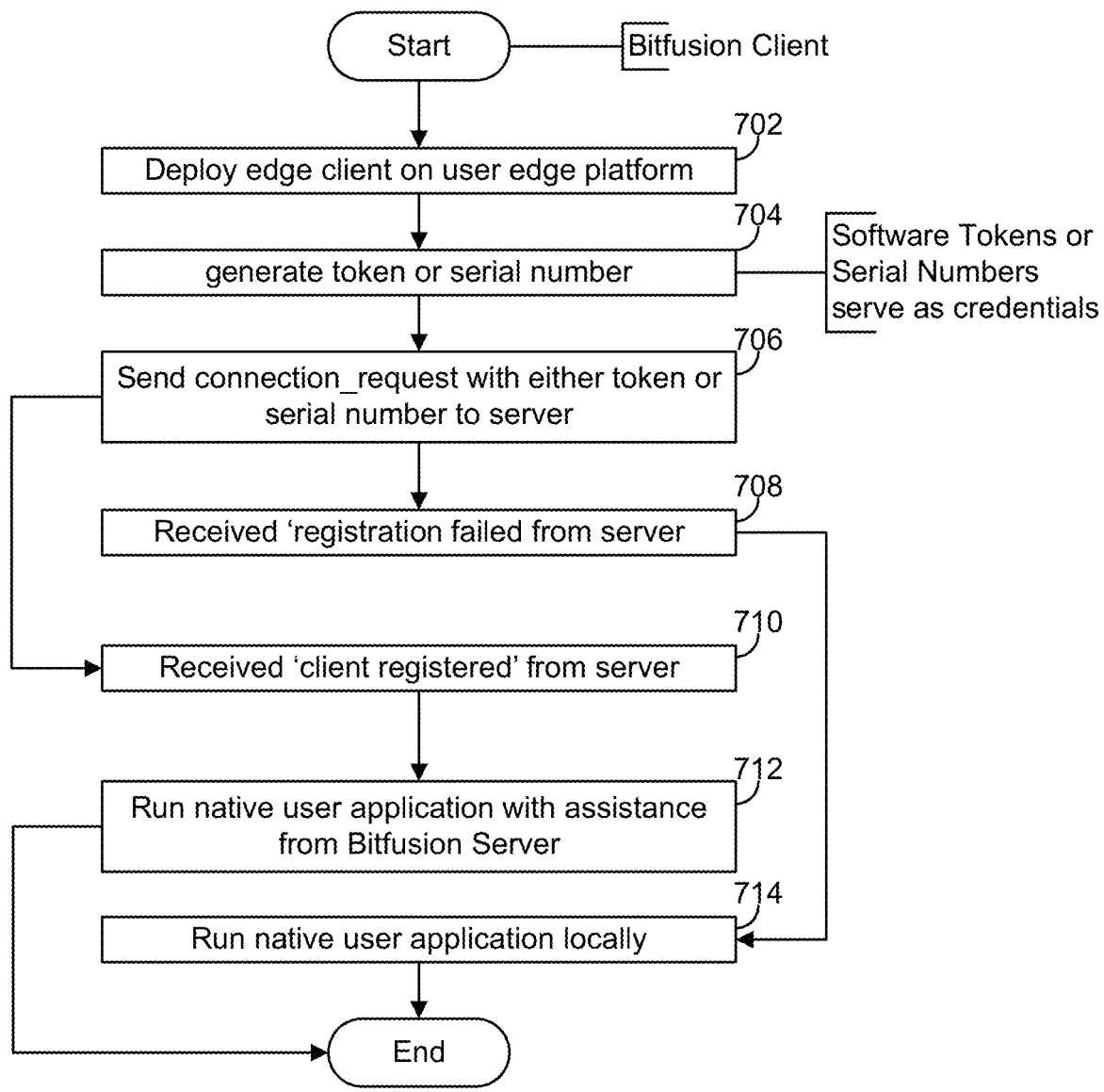
FIGS. 7A and 7B depict a flow of operations of a Bitfusion Server and Client integrated into the Edge Cloud, according to an embodiment.
Figure 7B:
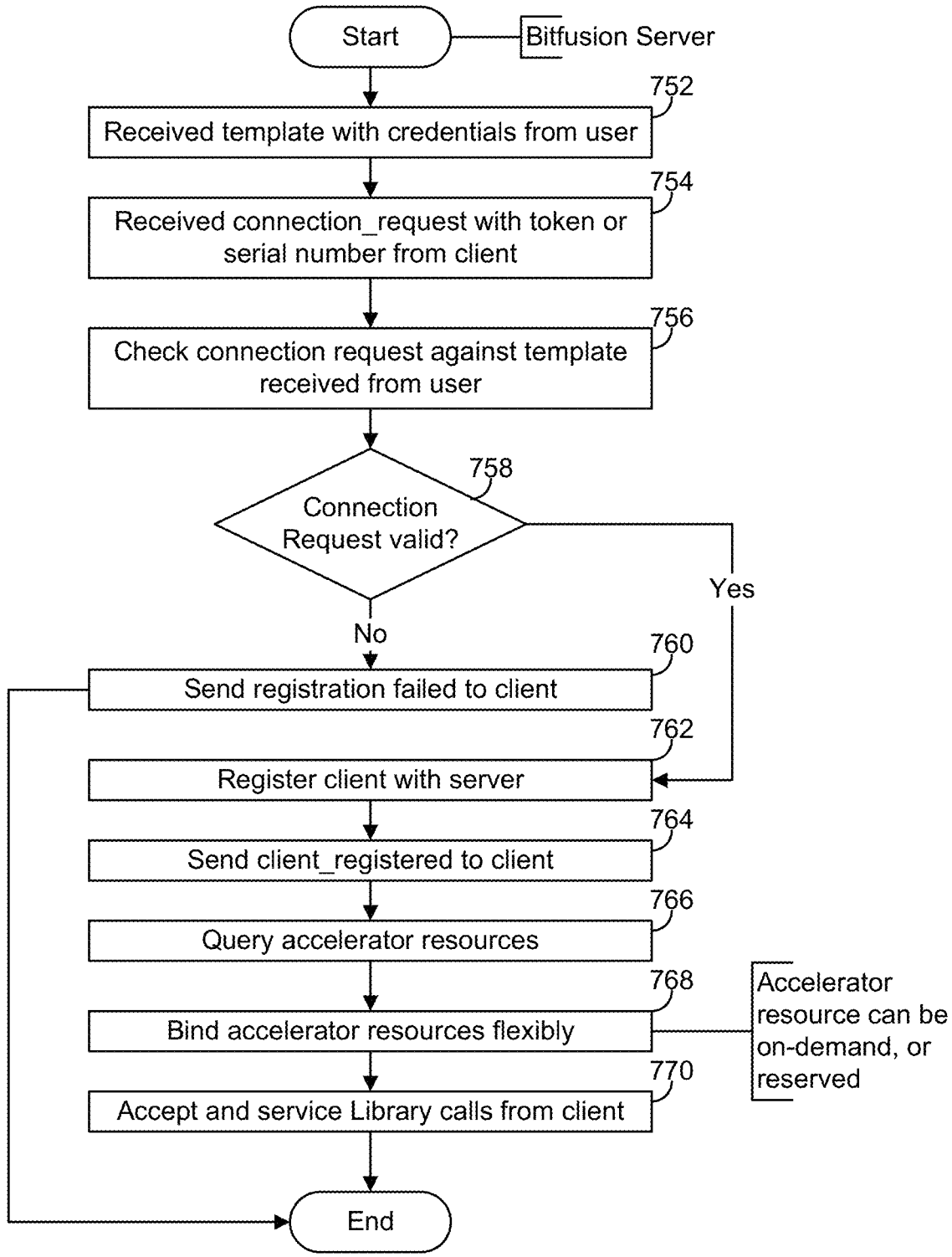

FIGS. 7A and 7B depict a flow of operations of a Bitfusion Server and Client integrated into the Edge Cloud, according to an embodiment.

Referring to FIG. 7A, in step 702, the Bitfusion client is deployed in MEC system 450 or as user equipment 438. In step 704, the Bitfusion Client generates a token or a serial number as a credential for registering itself with a Bitfusion Server located in MEC system 450. In step 706, the Bitfusion Client sends a connection request message with either the token or the serial number to the Bitfusion Server. The Bitfusion Client then waits for and receives a 'client registered' or 'registration failed' message from the Bitfusion Server. When the 'client registered' message is received in step 710, the Bitfusion Client runs the user application with assistance from the Bitfusion Server in step 712. When the 'registration failed' message is received in step 708, the Bitfusion Client runs the user application locally (e.g., with no assistance) in step 714.

FIG. 7B depicts a flow of operations of a Bitfusion Server according to an embodiment. In step 752, the Bitfusion Server receives a template with credentials from the user. The template describes the physical hardware (CPU, memory, permanent storage, networking) of the Bitfusion Client along with credentials that need to be provided by a client to use the Bitfusion Server. In step 754, the Bitfusion Server waits for and receives a connection request with a token or a serial number as a credential for registering with the Bitfusion Server. In step 756, the Bitfusion Server checks the connection request against the template received from the user. If the connection request is valid (because it has the proper credentials) as determined in step 758, then the Bitfusion Server registers the Bitfusion client in step 762 so that the Bitfusion Client can use the accelerators in the Bitfusion Server. In step 764, the Bitfusion Server sends a 'client registered' message to the Bitfusion Client. In step 766, the Bitfusion Server queries the accelerator resources and in step 768 binds the accelerator resources flexibly to the Bitfusion Client, deciding which resources are on-demand and which are reserved. On-demand resources may be reassigned to different Bitfusion clients while reserved resources are dedicated during execution of the application on the Bitfusion client to the Bitfusion client. In step 770, the Bitfusion Server accepts and services library calls from the Bitfusion Client. If the connection request is invalid as determined in step 758, the Bitfusion Server sends a connection failed message to the Bitfusion Client in step 760.

Thus, by employing the application support of a MEC host, a Bitfusion client and Bitfusion server operate within the telecommunications network system to provide a pool of accelerators that are available from one or more Bitfusion clients. The Bitfusion clients may include devices in the IoT array of devices as well as other MEC hosts.

Certain embodiments as described above involve a hardware abstraction layer on top of a host computer. The hardware abstraction layer allows multiple contexts to share the hardware resource. These contexts are isolated from each other in one embodiment, each having at least a user application program running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application program runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application program and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application program's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained only to use a defined amount of resources such as CPU, memory, and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations, including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system. Computer-readable media may be based on any existing or subsequently developed technology for embodying computer programs in a manner that enables them to be read by a computer. Examples of a computer-readable medium include a hard drive, network-attached storage (NAS), read-only memory, random-access memory (e.g., a flash memory device), a CD (Compact Discs)—CD-ROM, a CDR, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of accessing a pool of accelerators on hardware of a server computer system, wherein the server computer system has loaded thereon a library, the method comprising:
   intercepting, at a client computer system, a library call by an application program on the client computer system, the client computer system having loaded thereon the library and the application program that uses the library, wherein the client computer system and the server computer system are running in edge nodes in a telecommunications system, and the edge nodes are connected to one or more user equipments that use the application program;
   sending, by the client computer system, the library call to the server computer system for execution assisted by the pool of accelerators;
   receiving, at the client computer system, results of the library call from the server computer system; and
   sending, by the client computer system, the results to the application program on the client computer system;
   wherein use by the one or more user equipments of the application program is accelerated by the pool of accelerators.

2. The method of claim 1, wherein at least one accelerator in the pool of accelerators is a graphical processing unit (GPU).

3. The method of claim 1, wherein the telecommunications system includes a wireless access system and the edge nodes connect to the wireless access system.

4. The method of claim 3, wherein the one or more user equipments connect to the edge nodes via the wireless access system.

5. The method of claim 4, wherein at least one of the one or more user equipments acts as another client computer system that connects to the server computer system.

6. The method of claim 1, wherein one or more accelerators of the pool of accelerators are recruited to assist in execution of the library call.

7. The method of claim 1, wherein one or more accelerators of the pool of accelerators are dedicated during execution of the application program to the execution of the library call.

8. The method of claim 1, wherein the client computer system includes a memory space that is shared with the pool of accelerators of the server computer system.

9. A system for accessing a pool of accelerators, the system comprising:
   edge nodes of a telecommunications system that include a client computer system and a server computer system;
   wherein the server computer system includes the pool of accelerators and has loaded thereon a library;
   wherein the client computer system has loaded thereon an application program and the library;
   one or more user equipments, connected to the edge nodes, that use the application program;
   wherein the client computer system is configured to:
      make a library call;
      intercept the library call to prevent the client computer system from executing the library call;
      send the library call to the server computer system for execution assisted by the pool of accelerators;
      receive results of the library call from the server computer system; and
      send the results to the application program on the client computer system;
   wherein use of the application program by the one or more user equipments is accelerated by the pool of accelerators.

10. The system of claim 9, wherein at least one accelerator in the pool of accelerators is a graphical processing unit (GPU).

11. The system of claim 9, wherein the edge nodes connect to a wireless access system.

12. The system of claim 11, wherein the one or more user equipments connect to the edge nodes via the wireless access system.

13. The system of claim 12, wherein at least one of the one or more user equipments acts as another client computer system that connects to the server computer system.

14. The system of claim 9, wherein one or more accelerators of the pool of accelerators are recruited to assist in execution of the library call.

15. The system of claim 9, wherein one or more accelerators of the pool of accelerators are dedicated to the execution of the library call.

16. A non-transitory computer-readable medium comprising instructions, which, when executed, cause a client computer system to carry out a method for accessing a pool of accelerators on hardware of a server computer system, wherein the server computer system has loaded thereon a library, the method comprising:

intercepting, at the client computer system, a library call by an application program on the client computer system, the client computer system having loaded thereon the library and the application program that uses the library, wherein the client computer system and the server computer system are running in edge nodes in a telecommunications system, and the edge nodes are connected to one or more user equipments that use the application program;

sending, by the client computer system, the library call to the server computer system for execution assisted by the pool of accelerators;

receiving, at the client computer system, results of the library call from the server computer system; and sending, by the client computer system, the results to the application program on the client computer system;

wherein use by the one or more user equipments of the application program is accelerated by the pool of accelerators.

17. The non-transitory computer-readable medium of claim 16, wherein at least one accelerator in the pool of accelerators is a graphical processing unit (GPU).

18. The non-transitory computer-readable medium of claim 16, wherein the telecommunications system includes a wireless access system, and the one or more user equipments connect to the edge nodes via the wireless access system.

19. The non-transitory computer-readable medium of claim 18, wherein at least one of the one or more user equipments acts as another client computer system that connects to the server computer system.

20. The non-transitory computer-readable medium of claim 16, wherein one or more accelerators of the pool of accelerators are recruited to assist in execution of the library call.

* * * * *